US009847703B2

(12) United States Patent
Fubuki

(10) Patent No.: US 9,847,703 B2
(45) Date of Patent: Dec. 19, 2017

(54) ROTOR MANUFACTURING METHOD

(71) Applicant: TOYOTA JIDOSHA KABUSHIKI KAISHA, Toyota-shi (JP)

(72) Inventor: Shingo Fubuki, Nissin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 260 days.

(21) Appl. No.: 14/886,330

(22) Filed: Oct. 19, 2015

(65) Prior Publication Data
US 2016/0126813 A1 May 5, 2016

(30) Foreign Application Priority Data
Oct. 31, 2014 (JP) ................................. 2014-222423

(51) Int. Cl.
*H02K 15/03* (2006.01)
(52) U.S. Cl.
CPC .................................... *H02K 15/03* (2013.01)
(58) Field of Classification Search
CPC ...................................................... H02K 15/03
See application file for complete search history.

(56) References Cited

U.S. PATENT DOCUMENTS

| | | | | |
|---|---|---|---|---|
| 3,920,129 A * | 11/1975 | le Vasseur | ............. | H02K 15/00 198/341.03 |
| 4,106,185 A * | 8/1978 | Lauer | ................ | H02K 15/0018 29/596 |
| 4,553,321 A * | 11/1985 | Zihlmann | ............... | H02K 15/00 198/341.03 |
| 5,240,235 A * | 8/1993 | Santandrea | ............ | H02K 15/00 269/309 |
| 5,363,546 A * | 11/1994 | Bradtmueller | ......... | H02K 13/04 29/564.1 |
| 2007/0143983 A1* | 6/2007 | Yamaguchi | .......... | H02K 15/005 29/596 |
| 2013/0009509 A1* | 1/2013 | Tsuge | ....................... | H02K 3/14 310/201 |
| 2016/0094097 A1 | 3/2016 | Fubuki | | |

FOREIGN PATENT DOCUMENTS

| | | |
|---|---|---|
| JP | 55-111645 A | 8/1980 |
| JP | 2001-37121 A | 2/2001 |
| JP | 2004-336927 A | 11/2004 |
| JP | 2013-153652 | 8/2013 |
| JP | 2015-116105 | 6/2015 |
| WO | WO 2015/087124 A2 | 6/2015 |

* cited by examiner

*Primary Examiner* — Carl Arbes
(74) *Attorney, Agent, or Firm* — Oblon, McClelland, Maier & Neustadt, L.L.P.

(57) ABSTRACT

In a rotor manufacturing method, a magnetic body is moved by being pushed by a pusher along a guide surface of a guide portion, and the magnetic body is in a stated of being biased to the guide surface since the magnetic body is urged by a restriction portion. Therefore, the magnetic body can slide reliably between the guide portion and the restriction portion while restricting an insertion posture of the magnetic body. Thus, even if a wall surface of a magnet insertion hole is provided with a protrusion, when the magnetic body slides with the guide surface as a reference, the magnetic body will not abut against the protrusion, and the magnetic body can be reliably loaded into the magnet insertion hole.

3 Claims, 5 Drawing Sheets

ROTOR MANUFACTURING METHOD

INCORPORATION BY REFERENCE

The disclosure of Japanese Patent Application No. 2014-222423 filed on Oct. 31, 2014 including the specification, drawings and abstract is incorporated herein by reference in its entirety.

BACKGROUND OF THE INVENTION

1. Field of the Invention

The invention relates to a method for manufacturing a rotor formed by loading magnets into magnet insertion holes of a stacked body formed by stacking laminated steel plates.

2. Description of Related Art

Conventionally, as a technique in such a field, there is Japanese Patent Application Publication No. 2013-153652 (JP 2013-153652 A). A rotor manufacturing method described in this Publication includes the following processes: a process in which magnets are temporarily arranged into magnet holes provided in a dummy member; a process in which magnet holes of a rotor core (a stacked body) are aligned with the magnet holes of the dummy member respectively; and a process in which the temporarily arranged magnets are pushed by an elongated component (a pusher) so that the magnets are inserted into the magnet holes of the rotor core. The arrangement relationship and sizes of the magnet holes in the dummy member are the same as those of the magnet holes in the rotor core, and by straightly pushing the magnets in the magnet holes in the dummy member using the elongated component, the magnets temporarily arranged in the magnet holes in the dummy member can be easily inserted into the magnet holes in the rotor core.

With the structure of this solution, in the case of inserting the magnets into the magnet holes in the rotor core, in the above described technique (JP 2013-153652 A), it is required to move the magnets smoothly in the magnet holes in the dummy member, and thus a desired clearance is required between a wall surface of the magnet holes and a surface of the magnets. Furthermore, if the clearance is too large due to a manufacturing error of the magnets, a downward inclination of a front end of the magnets will become too large as the magnets are pushed by the elongated component. Consequently, a problem that the magnets can not be loaded reliably may occur.

SUMMARY OF THE INVENTION

An object of the invention is to provide a rotor manufacturing method by which a magnetic body can be reliably loaded into a magnet insertion hole of a stacked body.

An aspect of the invention provides a rotor manufacturing method, wherein the rotor includes: a stacked body provided with a magnet insertion hole extending in a direction of a rotation axis, and formed by stacking laminated steel plates in an extending direction of the rotation axis; a protrusion protruding from a wall surface which forms the magnet insertion hole; and a bar-shaped magnetic body arranged in the magnet insertion hole, the rotor manufacturing method comprises: loading the magnetic body into the magnet insertion hole by pushing the magnetic body on a guide surface towards the magnet insertion hole while an posture of the magnetic body is restricted by the guide surface and a restriction portion, wherein the guide surface is arranged on a magnet insertion device provided at a magnet insertion inlet side of the magnet insertion hole and is in contact with one side surface of the bar-shaped magnetic body, and the restriction portion restricts the posture of the magnetic body.

In the rotor manufacturing method, while the magnetic body is moved by being pushed by a pusher along the guide surface, the magnetic body is in a state of being biased to the guide surface since the magnetic body is urged by the restriction portion. Therefore, the magnetic body can slide reliably between the guide surface and the restriction portion while restricting an insertion posture of the magnetic body using the guide surface. Thus, even if a wall surface of the magnet insertion hole is provided with a protrusion, when the magnetic body slides with the guide surface as a reference, a front end of the magnetic body will not abut against the protrusion, and the magnetic body can be reliably loaded into the magnet insertion hole.

Moreover, in a state where a rear end of the magnetic body is magnetically attracted to a magnet provided at a front end of a pusher for pushing the magnetic body, the magnetic body is pushed by the pusher. If such a method is adopted, until the magnetic body is completely pushed into the magnet insertion hole by sliding the magnetic body along the guide surface, the magnetic body will not separate from the pusher due to the existence of the magnet of the pusher. As a result, the magnetic body can be loaded always in a straight state until it is completely pushed into the magnet insertion hole. Therefore, a situation is unlikely to occur in which as the insertion of the magnetic body progresses, a downward inclination of the front end of the magnetic body gradually increases due to the weight of the magnetic body itself, and a situation in which the front end of the magnetic body abuts against the protrusions can be avoided more reliably.

Furthermore, the restriction portion is further moved and the pusher is sandwiched by the restriction portion and the guide surface, after the magnetic body is loaded into the magnet insertion hole, such that a rear end of the magnetic body is made to abut against at least one of a front end surface of a guide portion formed with the guide surface and a front end surface of the restriction portion while the pusher is being retreated so that the magnetic body is separated from the pusher. If this method is adopted, it is possible to easily separate the magnetic body from the pusher during the retreat of the pusher.

According to the above aspect of the invention, the magnetic body can be reliably loaded into the magnet insertion hole of the stacked body.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The preferred embodiments of the rotor manufacturing method according to the invention are described in detail hereinafter with reference to the accompanying drawings.

First Embodiment

Figure 1:
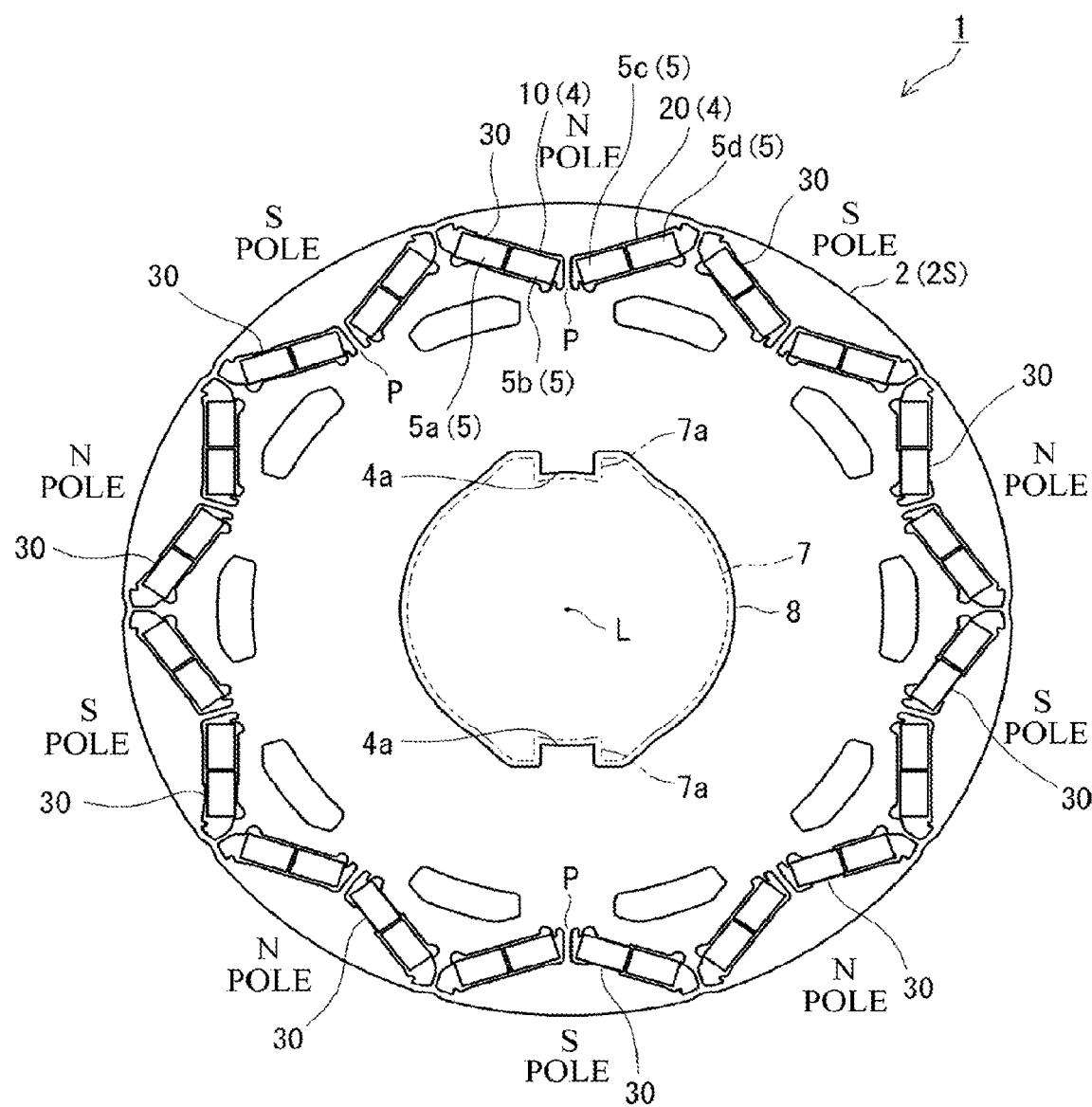
FIG. 1 is a front view of a rotor manufactured by the rotor manufacturing method according to the invention.
Figure 2A:
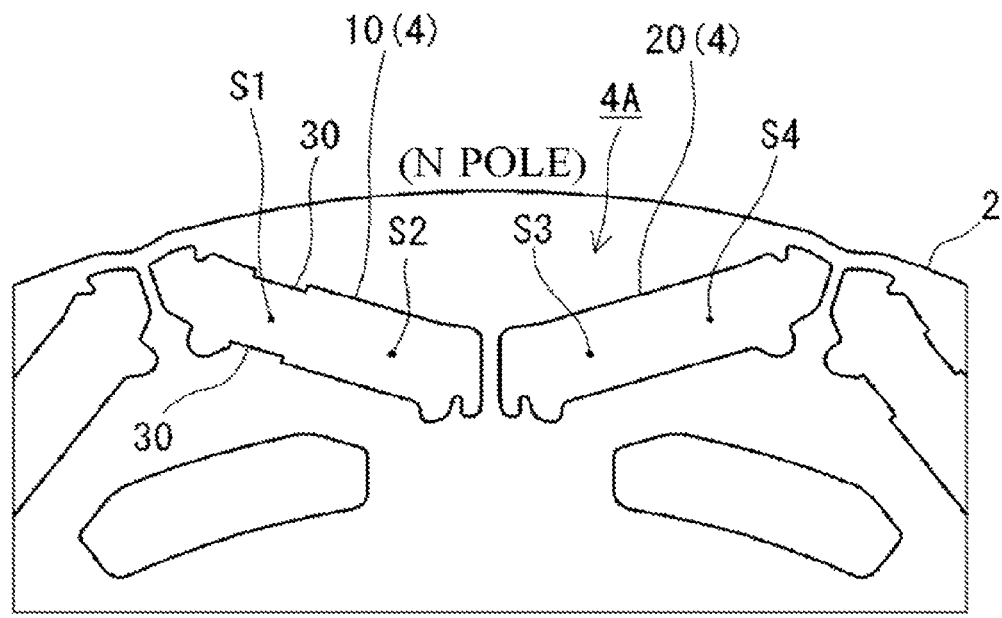
FIG. 2A is a partially enlarged front view showing a main part of a stacked body.
Figure 2B:
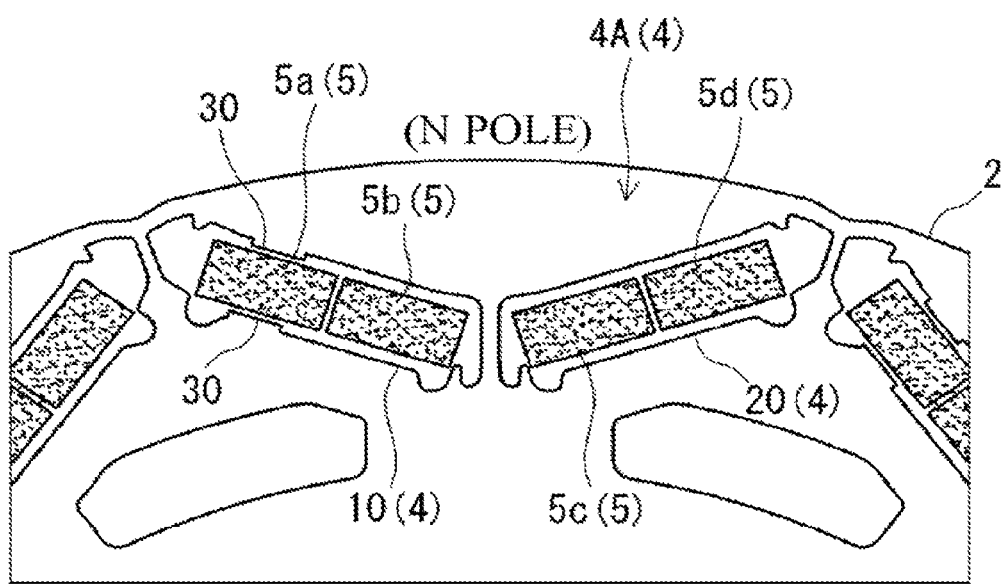
FIG. 2B is a partially enlarged front view showing a main part of the rotor after magnets are loaded.

A rotor 1 shown in FIGS. 1 and 2 is used as a motor for driving a hybrid vehicle or a generator. Furthermore, in addition to the hybrid vehicle, the rotor can be also used in an electric vehicle and a fuel cell vehicle.

The rotor 1 is constituted by a stacked body 3 and magnets 5, the stacked body 3 is formed by stacking thin laminated steel plates 2, which are formed by punching steel plates with an insulating coating film into a circular disk shape, in an extending direction of a rotation axis L (see FIG. 3), and the magnets 5 are arranged in magnet insertion holes 4 formed in the stacked body 3. An opening portion 8 for inserting a rotary shaft 7 is formed in the center of the stacked body 3. Keys 4a are formed to protrude towards the rotation axis L from a periphery of the opening portion 8, and the keys 4a are embedded in key grooves 7a formed in the rotary shaft 7. A pair of keys 4a are arranged with a difference in phase angle of 180 degrees from each other. Moreover, by punching the steel plates with insulating coating film, a peeling of the insulating coating film occurs in the cutting face, and the steel is exposed.

Further, in the rotor 1, S and N poles are arranged alternately in a circumferential direction, and at each pole, four magnets 5a to 5d are arranged in the magnet insertion hole 4. The magnet insertion hole 4 provided for each pole is formed by a slit-shaped first magnet insertion hole 10 inclining inwardly from an outer side and a slit-shaped second magnet insertion hole 20 inclining inwardly from an outer side into a V-shape having a top portion P at the rotation axis L side.

Furthermore, bar-shaped first and second magnets 5a, 5b having a rectangular cross section are arranged in the first magnet insertion hole 10, and bar-shaped third and fourth magnets 5c, 5d having a rectangular cross section are arranged in the second magnet insertion hole 20. The first magnet 5a and the second magnet 5b are molded with resin in a contact state, and are loaded in an integrated state into the first magnet insertion hole 10. The third magnet 5c and the fourth magnet 5d are also loaded into the second magnet insertion hole 20 in a similar manner. The first to fourth magnets 5a to 5d are magnetized into the same polarity, and the magnets 5 in the inverted V-shaped magnet insertion hole 4 are of the same polarity. Each of the magnet insertion holes 10 and 20 is formed by punching with a press.

As shown in FIG. 2, the first magnet insertion hole 10 of the stacked body 3 is constituted by a first magnet insertion half portion S1 located at an outer side and a second magnet insertion half portion S2 located at an inner side. Then, the first magnet 5a is arranged in the first magnet insertion half portion S1, and the second magnet 5b is arranged in the second magnet insertion half portion S2. Similarly, the second magnet insertion hole 20 is constituted by a third magnet insertion half portion S3 located at an inner side and a fourth magnet insertion half portion S4 located at an outer side. Then, the third magnet 5c is arranged in the third magnet insertion half portion S3, and the fourth magnet 5d is arranged in the fourth magnet insertion half portion S4.

Figure 3:
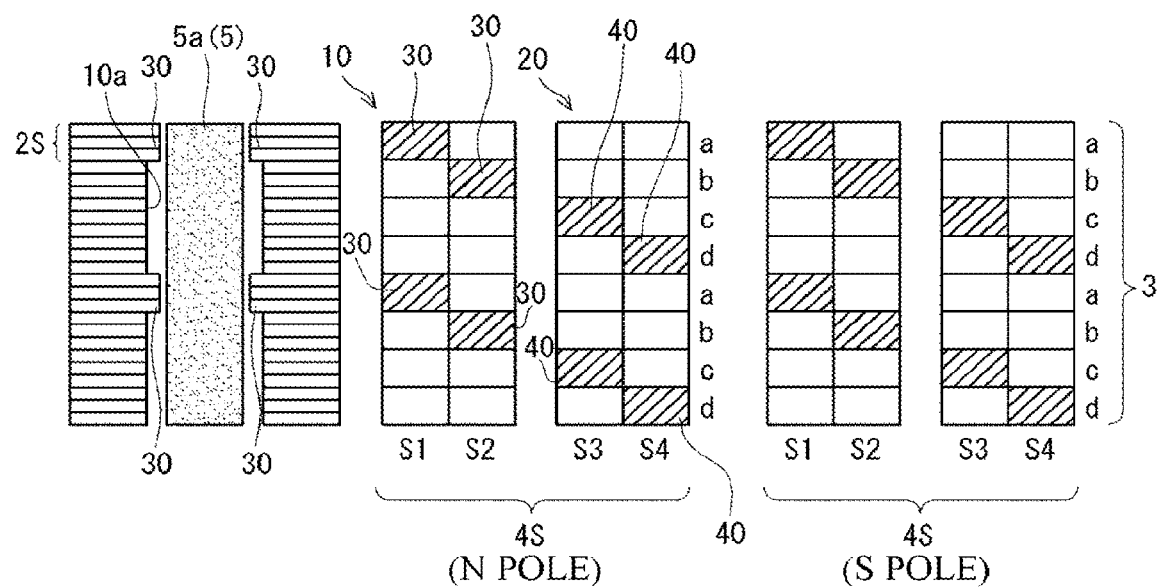
FIG. 3 is a schematic view showing the arrangement state of protrusions.

As shown in FIG. 3, the stacked body 3 is formed with protrusions 30 protruding from a wall surface 10a of the first magnet insertion hole 10. The protrusions 30 are arranged in a step-like manner in a circumferential direction of the stacked body 3 in such a way that the protrusions 30 do not overlap in an extending direction of the rotation axis L. Protrusions 40 protruding from the second magnet insertion hole 20 are similar to the protrusions 30; however, the protrusions 40 are arranged so as not to overlap with the protrusions 30 in the circumferential direction. By such an arrangement of the protrusions 30 and 40, a reduction of eddy current loss occurring in the direction of the rotation axis L is achieved.

Next, the steps of assembling the magnets 5a to 5d to the stacked body 3 in the rotor manufacturing method are described. Furthermore, for the first magnet 5a and the second magnet 5b, magnetic bodies before magnetization are molded in a state of contacting with each other, and the integrated magnetic body 5A is magnetized after being loaded into the first magnet insertion hole 10 and molded with resin. The same applies to the third magnet 5c and the fourth magnet 5d loaded into the second magnet insertion hole 20.

Figure 4:
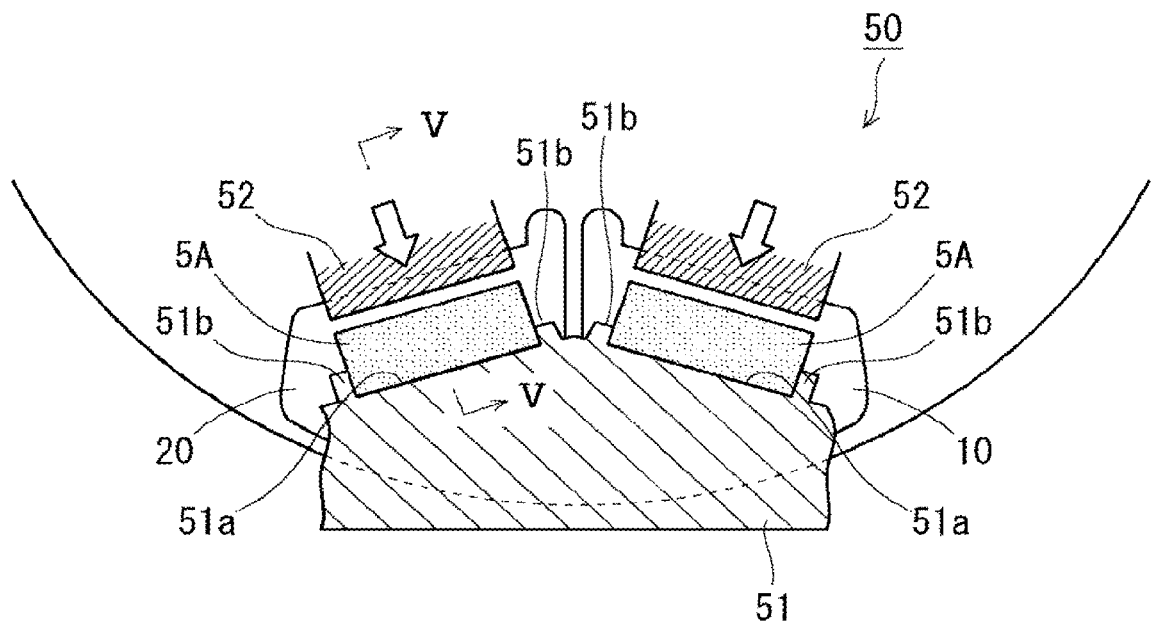
FIG. 4 is a sectional view showing a main part of a magnet insertion device.
Figure 5:
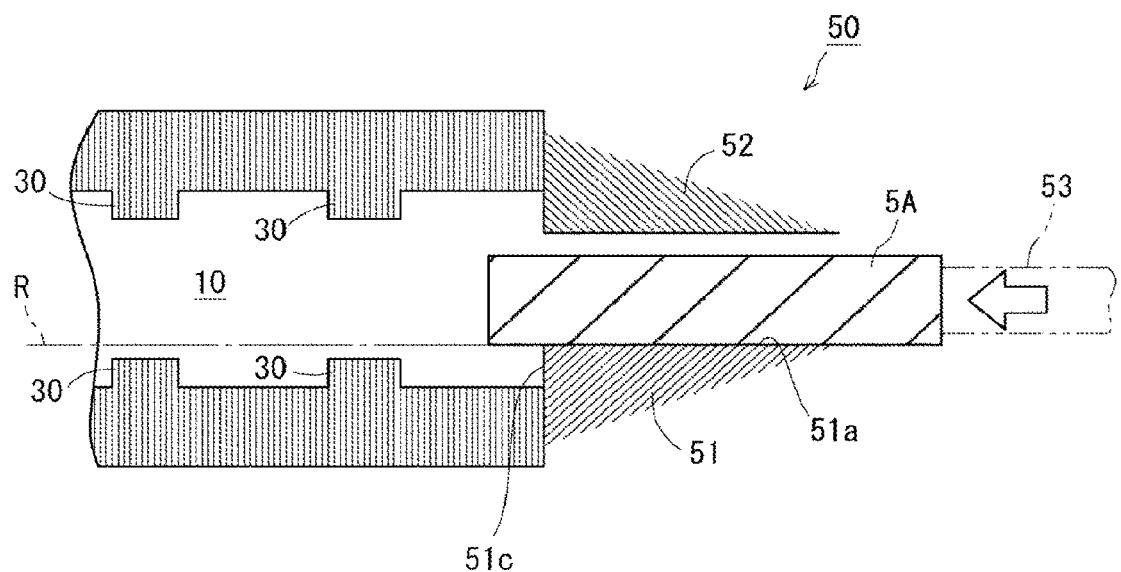
FIG. 5 is a sectional view taken along line V-V in FIG. 4.

As shown in FIGS. 4 and 5, before the magnetic body 5A, which is formed by integrating the first magnet 5a and the second magnet 5b before magnetization, is inserted into the first magnet insertion hole 10, the stacked body 3 is set at a specified position. In this case, the stacked body 3 is set with its rotation axis L being horizontal. Relative to the stacked body 3 set by a desired jig, the magnetic body 5A is inserted towards the magnet insertion hole 10 using a magnet insertion device 50.

The magnet insertion device 50 is provided, as main constituent components, with: a guide portion 51 carrying the bar-shaped magnetic body 5A having a rectangular cross section, and having a guide surface 51a in contact with one side surface of the magnetic body 5A; a restriction portion 52 which is arranged opposed to the guide surface 51a of the guide portion 51 and can move close to or away from the guide portion 51; a pusher 53 for pushing the magnetic body 5A into the first magnet insertion hole 10; and a setting jig (not shown) configured to set the stacked body 3 at the specified position.

The guide portion 51 is fixed to a device body of the magnet insertion device 50, and the guide surface 51a is inclined in an inverted V-shape corresponding to the inclination of the first magnet insertion hole 10. The guide surface 51a extending along the extending direction of the rotation axis L, i.e., the direction in which the magnetic body 5A is inserted, is provided with guide protrusions 51b extending along the direction in which the magnetic body 5A is inserted. The guide protrusions 51b are used to prevent a lateral sliding caused by the inclination of the guide surface 51a. The freely movable restriction portion 52 is lineally driven by a miniaturized actuator such as an air piston or an electromagnetic solenoid along a direction orthogonal to the rotation axis L. The pusher 53 performs a back and forth movement in the extending direction of the rotation axis L by means of a miniaturized actuator such as an air piston.

To use such a magnet insertion device 50, firstly, the guide portion 51 and the restriction portion 52 are arranged at a magnet insertion inlet side of the magnet insertion hole 10 (see FIGS. 4 and 5). In this case, the guide portion 51 is arranged at the magnet insertion inlet side of the magnet insertion hole 10 in such a way that an extending surface R of the guide surface 51a will not fall onto the protrusions 30. In this state, when pushed by the pusher 53, the magnetic body 5A slides on the guide surface 51a, a front end of the magnetic body 5A protrudes slightly from a front end surface 51c of the guide portion 51, and the advancing of the magnetic body 5A is stopped temporarily. In this case, the magnetic body 5A is stopped in a state where the front end of the magnetic body 5A has not yet reached the protrusions 30 (see FIG. 5).

Figure 6:
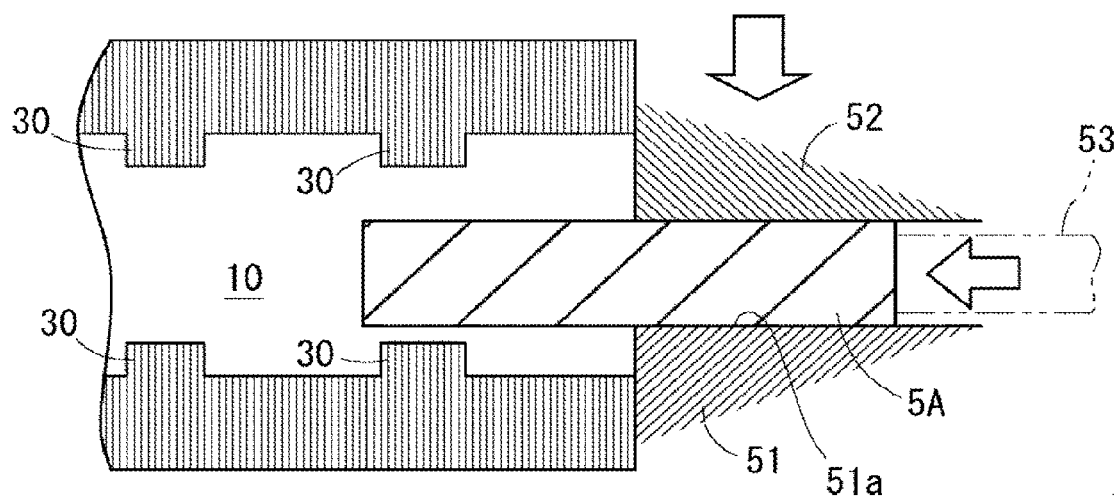
FIG. 6 is a sectional view showing a state in which a magnetic body is sandwiched by a guide portion and a restriction portion.

In the stopped state of the magnetic body 5A, the restriction portion 52 is moved towards the guide portion 51 by the actuator, the magnetic body 5A on the guide surface 51a is sandwiched by the restriction portion 52 and the guide portion 51, and the magnetic body 5A is pressed against the guide surface 51a so as to form a state of being biased to one side. In this case, the force for sandwiching the magnetic body 5A by the guide portion 51 and the restriction portion 52, namely the pressing force of the restriction portion 52, is set to be weaker than the force for enabling the magnetic body 5A to slide between the guide surface 51a and the restriction portion 52. Furthermore, after the preparation for advancing the magnetic body 5A is finished, as shown in FIG. 6, the magnetic body 5A is pushed by the pusher 53 so as to be loaded completely into the magnet insertion hole 10. Then, resin is filled into the magnet insertion hole 10, and the magnetic body 5A is fixed within the magnet insertion hole 10.

Such a loading may be performed individually for each magnet insertion hole 10, or the magnetic bodies 5A may also be loaded simultaneously into individual magnet insertion holes 10. It is to be noted that the above described magnet insertion device 50 may also be used for the magnet insertion hole 20.

In such a rotor manufacturing method, when the magnetic body 5A is pushed by the pusher 53 along the guide surface 51a of the guide portion 51 and is moved, the magnetic body 5A is in a state of being biased against the guide surface 51a when urged by the restriction portion 52. Hence, an insertion posture of the magnetic body 5A can be restricted by the guide surface 51a, and the magnetic body 5A can slide reliably between the guide portion 51 and the restriction portion 52. Therefore, even if the wall surfaces of the magnet insertion holes 10, 20 are provided with the protrusions 30, 40, as long as the magnetic body 5A slides with the guide surface 51a as a reference, the magnetic body 5A will not abut against the protrusions 30, 40, and the magnetic body 5A can be reliably loaded into the magnet insertion holes 10, 20.

Second Embodiment

As shown in FIGS. 7A to 7D, the magnet insertion device 60 according to the second embodiment is significantly different from the magnet insertion device 50 according to the first embodiment in that the front end of the pusher 63 is provided with a magnet 63a. Furthermore, components identical to or equivalent to those of the first embodiment are designated by the same reference numerals and a detailed description thereof is omitted.

Figure 7A:
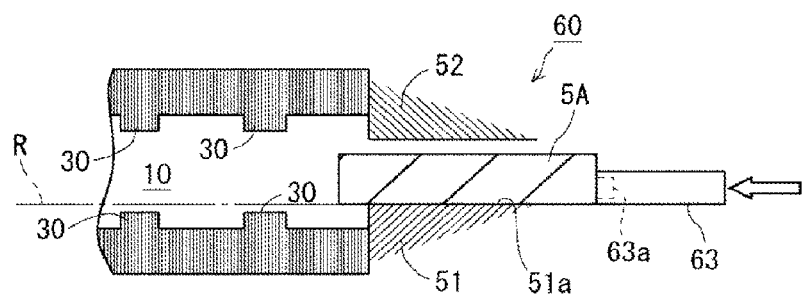
FIG. 7A shows a sectional view of another embodiment of the rotor manufacturing method according to the invention.

Firstly, the guide portion 51 and the restriction portion 52 are arranged at the inlet side of the magnet insertion hole 10 (see FIG. 7A). In this case, the guide portion 51 is arranged at the inlet side of the magnet insertion hole 10 in such a way that an extending surface R of the guide surface 51a will not fall onto the protrusions 30. In this state, when pushed by the pusher 63, the magnetic body 5A slides on the guide surface 51a, and the front end of the magnetic body 5A protrudes slightly from a front end surface 51c of the guide portion 51. At this time, the magnetic body 5A is magnetically attracted to the magnet 63a provided at the front end of the pusher 63. By means of the magnetic attracting effect of the magnet 63a, the magnetic body 5A will not separate from the pusher 63, and the magnetic body 5A can therefore be reliably pushed by the pusher 63.

Figure 7B:
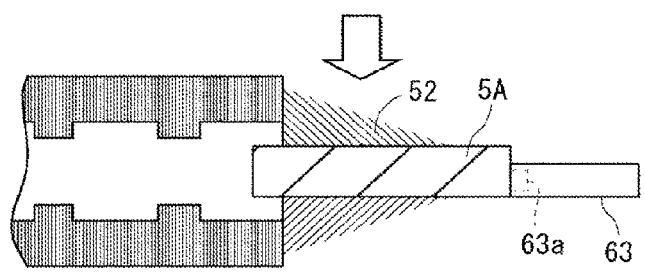
FIG. 7B shows a sectional view of another embodiment of the rotor manufacturing method according to the invention.

In the stopped state of the magnetic body 5A, the restriction portion 52 is moved towards the guide portion 51 by the actuator, the magnetic body 5A on the guide surface 51a is sandwiched by the restriction portion 52 and the guide portion 51, and the magnetic body 5A is pressed against the guide surface 51a to bring the magnetic body 5A into a state of being biased to one side (see FIG. 7B). Then, the magnetic body 5A is pushed by the pusher 63 and is completely loaded into the magnet insertion hole 10 (see FIG. 7C). In this state, the insertion posture of the magnetic body 5A can be maintained even when the magnetic body 5A is completely loaded.

By using such a pusher 63 with a magnet, until the magnetic body 5A is completely pushed into the magnet insertion hole 10, the magnetic body 5A will not separate from the pusher 63 due to the existence of the magnet 63a of the pusher 63. As a result, the magnetic body 5A can be loaded always in a straight state until it is completely pushed into the magnet insertion hole 10. Therefore, a situation is unlikely to occur in which as the insertion of the magnetic body 5A progresses, a downward inclination of the front end of the magnetic body 5A gradually increases due to the weight of the magnetic body 5A itself, and a situation in which the front end of the magnetic body 5A abuts against the protrusions 30 can be avoided more reliably.

Figure 7C:
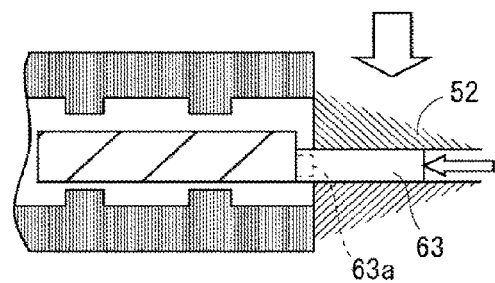
FIG. 7C shows a sectional view of another embodiment of the rotor manufacturing method according to the invention.
Figure 7D:
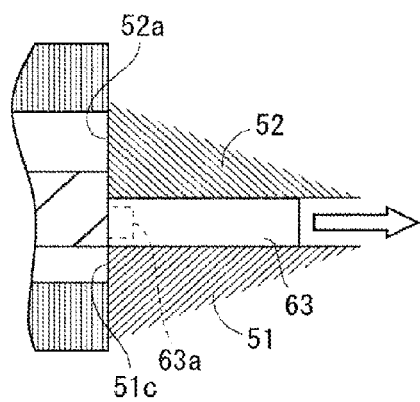
FIG. 7D shows a sectional view of another embodiment of the rotor manufacturing method according to the invention.

After the magnetic body 5A is loaded into the magnet insertion hole 10, the restriction portion 52 is further moved, and the pusher is sandwiched by the restriction portion 52 and the guide portion 51 (see FIG. 7C). Subsequently, the pusher 63 is retreated, and a rear end of the magnetic body 5A abuts against a front end surface 52a of the restriction portion 52, thereby separating the magnetic body 5A from the pusher 63. With this method, the magnetic body 5A can be easily separated from the pusher 63 during the retreat of the pusher 63.

The invention is not limited to the previously described embodiments, and various modifications such as those to be described below can also be made without departing from the scope of the spirit of the invention.

The magnetic body 5A described above may be a magnetic body before magnetization or a magnetic body after magnetization. The rear end of the magnetic body 5A may abut against both or only one of the front end surface 51c of the guide portion 51 and the front end surface 52a of the restriction portion 52, so that the magnetic body 5A can be separated from the pusher 63.

The protrusions 30, 40 may be formed over substantially the entire length of the opposite long sides of the magnet insertion holes 10, 20, and may also be formed over a part of the length. Furthermore, the protrusions 30, 40 may also be formed on one or both of the opposite long sides.

Furthermore, the restriction portion 52 may be a roller, and by adopting such a roller, a balance between the force for pressing the magnetic body 5A against the guide surface 51a and the force for making the magnetic body 5A slide along the guide surface 51a can be easily obtained.

What is claimed is:

1. A rotor manufacturing method, wherein the rotor comprises: a stacked body provided with a magnet insertion hole extending in a direction of a rotation axis, and formed by stacking laminated steel plates in an extending direction of the rotation axis; a protrusion protruding from a wall surface which forms the magnet insertion hole; and a bar-shaped magnetic body arranged in the magnet insertion hole, the rotor manufacturing method comprising:

loading the magnetic body into the magnet insertion hole by pushing the magnetic body on a guide surface towards the magnet insertion hole while an posture of the magnetic body is restricted by the guide surface and a restriction portion, wherein the guide surface is arranged on a magnet insertion device provided at a magnet insertion inlet side of the magnet insertion hole and is in contact with one side surface of the bar-shaped magnetic body, and the restriction portion restricts the posture of the magnetic body.

2. The rotor manufacturing method according to claim 1, wherein in a state where a rear end of the magnetic body is magnetically attracted to a magnet provided at a front end of a pusher for pushing the magnetic body, the magnetic body is pushed by the pusher.

3. The rotor manufacturing method according to claim 2, wherein the restriction portion is further moved and the pusher is sandwiched by the restriction portion and the guide surface, after the magnetic body is loaded into the magnet insertion hole, such that a rear end of the magnetic body is made to abut against at least one of a front end surface of a guide portion formed with the guide surface and a front end surface of the restriction portion while the pusher is being retreated so that the magnetic body is separated from the pusher.

* * * * *